US010061050B2

(12) United States Patent
Yu et al.

(10) Patent No.: US 10,061,050 B2
(45) Date of Patent: Aug. 28, 2018

(54) FRACTAL MAGNETIC SENSOR ARRAY USING MEGA MATRIX DECOMPOSITION METHOD FOR DOWNHOLE APPLICATION

(71) Applicant: GOWell International, LLC, Houston, TX (US)

(72) Inventors: Yanxiang Yu, Houston, TX (US); Nicholas Boggs, Houston, TX (US); Jinsong Zhao, Houston, TX (US)

(73) Assignee: GOWell International, LLC, Houston, TX (US)

( * ) Notice: Subject to any disclaimer, the term of this patent is extended or adjusted under 35 U.S.C. 154(b) by 0 days.

(21) Appl. No.: 15/231,551

(22) Filed: Aug. 8, 2016

(65) Prior Publication Data

US 2018/0038985 A1 Feb. 8, 2018

(51) Int. Cl.
*G01V 3/10* (2006.01)
*G01V 3/18* (2006.01)
*G01V 3/28* (2006.01)
*G01B 7/06* (2006.01)
*E21B 47/00* (2012.01)
*E21B 47/12* (2012.01)

(52) U.S. Cl.
CPC ............... *G01V 3/28* (2013.01); *E21B 47/00* (2013.01); *E21B 47/12* (2013.01); *G01B 7/06* (2013.01)

(58) Field of Classification Search
CPC ........... G01V 3/28; E21B 47/00; E21B 47/12; G01B 7/06
USPC .................................................. 324/323–377
See application file for complete search history.

(56) References Cited

U.S. PATENT DOCUMENTS

| | | | | | |
|---|---|---|---|---|---|
| 3,230,445 | A | * | 1/1966 | Sloughter | G01V 3/28 324/339 |
| 3,893,020 | A | * | 7/1975 | Meador | E21B 49/00 324/341 |
| 4,604,581 | A | * | 8/1986 | Thadani | G01V 3/28 324/339 |
| 4,611,173 | A | * | 9/1986 | Bravenec | G01V 3/28 324/339 |
| 4,780,678 | A | * | 10/1988 | Kleinberg | G01V 3/28 324/338 |

(Continued)

OTHER PUBLICATIONS

Aulia et al., Resistivity Behind Casing, Oilfield Review, Spring 2001.*

*Primary Examiner* — Patrick Assouad
*Assistant Examiner* — Sean Curtis (57) ABSTRACT

Methods and a system for detecting through casing formation resistivity. A method may comprise inserting an inspection device inside a tube, activating the transmitter coil, recording signals with the receiver coil array, creating a transmitter matrix from an electromagnetic field produced from the transmitter coil, creating a receiver matrix from the recorded signals, and determining a through casing formation resistivity of a target from the transmitter matrix and the receiver matrix. A method may further comprise determining a casing thickness of a target from the transmitter matrix and the receiver matrix. An inspection device may comprise a sensor array comprising a transmitter coil array and a receiver coil array. The inspection device may further comprise a sensor array housing, wherein the sensor array is disposed within the sensor array housing, a memory module, and a differential amplifier.

16 Claims, 3 Drawing Sheets

(56) References Cited

U.S. PATENT DOCUMENTS

| | | | |
|---|---|---|---|
| 6,541,975 B2* | 4/2003 | Strack | G01V 11/00 181/102 |
| 6,586,939 B1* | 7/2003 | Fanini | G01V 3/28 324/339 |
| 6,734,675 B2* | 5/2004 | Fanini | G01V 3/28 324/339 |
| 7,199,586 B2* | 4/2007 | Fanini | G01V 3/28 324/334 |
| 7,202,671 B2* | 4/2007 | Strack | G01V 3/24 324/355 |
| 7,205,770 B2* | 4/2007 | Forgang | G01V 3/28 324/339 |
| 7,272,503 B2* | 9/2007 | Strack | G01V 3/24 324/370 |
| 7,336,199 B2* | 2/2008 | Lasater | E21B 47/12 340/853.1 |
| 7,388,382 B2* | 6/2008 | Strack | G01V 3/24 324/355 |
| 7,443,168 B2* | 10/2008 | Gold | G01V 3/28 324/333 |
| 7,855,560 B2* | 12/2010 | Zhao | G01V 3/24 324/357 |
| 7,859,265 B2* | 12/2010 | Zhao | G01V 3/20 324/355 |
| 7,863,902 B2* | 1/2011 | Jinsong | G01V 3/24 324/347 |
| 7,902,827 B2* | 3/2011 | Forgang | G01V 3/265 324/338 |
| 7,950,472 B2* | 5/2011 | DiFoggio | E21B 47/06 175/38 |
| 8,050,865 B2* | 11/2011 | Zhao | G01V 3/24 702/7 |
| 8,274,289 B2* | 9/2012 | Bittar | E21B 47/024 324/338 |
| 8,456,166 B2* | 6/2013 | DePavia | G01V 3/28 324/333 |
| 8,555,966 B2* | 10/2013 | Maxit | E21B 49/087 166/250.01 |
| 8,886,483 B2* | 11/2014 | Zhao | G01V 3/20 702/11 |
| 9,013,955 B2* | 4/2015 | Zhao | E21B 47/0005 367/25 |
| 9,037,415 B2* | 5/2015 | Zhao | G01V 3/38 702/7 |
| 9,103,196 B2* | 8/2015 | Zhao | E21B 47/082 |
| 9,157,312 B2* | 10/2015 | Zhao | G01V 1/44 |
| 2001/0038287 A1* | 11/2001 | Amini | G01V 3/28 324/341 |
| 2010/0134113 A1* | 6/2010 | DePavia | G01V 3/28 324/346 |
| 2010/0305862 A1* | 12/2010 | Li | G01V 3/30 702/7 |
| 2016/0168975 A1* | 6/2016 | Donderici | E21B 47/0006 324/238 |
| 2016/0170063 A1* | 6/2016 | Leggett | G01V 1/44 367/7 |
| 2016/0216397 A1* | 7/2016 | Donderici | E21B 47/0905 |
| 2017/0002642 A1* | 1/2017 | Zhao | E21B 47/101 |
| 2017/0081955 A1* | 3/2017 | Yu | E21B 47/12 |
| 2017/0138132 A1* | 5/2017 | Wilson | E21B 17/028 |
| 2018/0017697 A1* | 1/2018 | Fouda | G01V 3/26 |

* cited by examiner

FRACTAL MAGNETIC SENSOR ARRAY USING MEGA MATRIX DECOMPOSITION METHOD FOR DOWNHOLE APPLICATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Disclosure

This disclosure relates to a field for a downhole tool that may be capable of detecting tubing thickness, free pipe detection, and/or casing resistivity detection. By detecting changes and variations of tubing walls an operator may be able to identify internal and/or external patches, clamps, corrosions, errosions, thickness, permeability, resitivity, and/or any combination thereof.

Background of the Disclosure

Tubing may be used in many different applications and may transport many types of fluids. Tubes may be conventionally placed underground and/or positioned in an inaccessible area, making inspection of changes within tubing difficult. It may be beneficial to measure the thickness variations within a tube while the tube is in use. Previous methods for inspecting tubes have come in the form of non-destructive inspection tools such as electromagnetic devices that may measure magnetic flux-leakage within tubing, which may not be able to detect changes in multi-pipe situations. Additionally, previous methods may not be able to perform multi-pipe azimuthal imaging. Without limitation, different types of inspection may use multiple types of downhole tools. A single electromagnetic device may be well suited for multiple types of tube inspection because it may operate and may be insensitive to any fluid within the tube and may use a single tool for a plurality of measurements.

Previous devices and methods may only measure flux-leakage and may only be useful for the detection of localized damage in ferromagnetic pipes. The measurement of flux-leakage may be hindered by the type of tube, thinning of tubing, requirements of a strong magnetic field, strong flux coupling, and a need for the device to be in close proximity to the tube walls. Additionally, electromagnetic tools that use eddy-current may be better suited for measuring the integrity of tubing. Drawbacks of a constant eddy-current electromagnetic tool may be that the signal from several frequencies may not penetrate a first wall of tubing and allow inspection of the integrity of a second wall of a larger surrounding tubing. Transient electromagnetic methods using pulsed electromagnetic waves may be limited to increasing the signals from a second tube wall to additional tube walls, have problems optimizing a receiver coil, and may suffer Signal-to-Noise Ratio problems.

Consequently, there is a need for an electromagnetic tool that may be able to detect and record multiple types of information and/or properties of tubing. In downhole applications, a downhole tool with multi-tubing wall variation imaging detection that may be capable of determining properties of turbine and may be accurate and efficient may be in high demand.

BRIEF SUMMARY OF SOME OF THE PREFERRED EMBODIMENTS

These and other needs in the art may be addressed in embodiments by a method for inspecting a tube. A method for detecting through casing formation resistivity may comprise inserting an inspection device inside a tube. The inspection device may comprises a sensor array, which may further comprise a transmitter coil and a receiver coil array. The inspection device may further comprise a micro controller unit, a telemetry module, a centralizing module. The method may further comprise activating the transmitter coil, recording signals with the receiver coil array, creating a transmitter matrix from an electromagnetic field produced from the transmitter coil, creating a receiver matrix from the recorded signals, and determining a through casing formation resistivity of a target from the transmitter matrix and the receiver matrix.

A method for detecting through casing formation resistivity may comprise inserting an inspection device inside a tube. The inspection device may comprises a sensor array, which may further comprise a transmitter coil and a receiver coil array. The inspection device may further comprise a micro controller unit, a telemetry module, a centralizing module. The method may further comprise activating the transmitter coil, recording signals with the receiver coil array, creating a transmitter matrix from an electromagnetic field produced from the transmitter coil, creating a receiver matrix from the recorded signals, and determining a casing thickness of a target from the transmitter matrix and the receiver matrix.

An inspection device may comprise a sensor array, which may comprise a transmitter coil array, wherein the transmitter coil array may comprise a plurality of transmitters and a receiver coil array, wherein the receiver coil array may comprise a plurality of receivers. The inspection device may further comprise a sensor array housing, wherein the sensor array may be disposed within the sensor array housing, a memory module, and a differential amplifier.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The present disclosure relates to embodiments of a device and method for inspecting and detecting characteristics of tubing and devices attached to tubing. More particularly, embodiments of a device and method are disclosed for inspecting a number of tube walls surrounding an innermost tube wall. In embodiments, an inspection device may induce an eddy current in surrounding tube walls by producing an electro-magnetic field, wherein the induced eddy current may be recorded and analyzed for aberrations. Eddy currents may be produced by a sensor array, which may be switched on and off to produce and record an induced eddy current in a tube and/or surrounding tube walls. The eddy current decay and diffusion in the tube walls may be recorded, specifically recording voltage in embodiments, which may produce a function of the tube thickness and electromagnetic properties (e.g. metal conductivity and magnetic permeability) and the configurations of tubes. In embodiments, the power provided to different sensors may be the same and/or different.

In embodiments, an inspection device may be a magnetic sensor array with one or more cores, partially and/or fully wound by different number of transmitters and/or receivers. Windings disposed on transmitters and/or receivers may be in any shape and may comprise any number of turns. Further, transmitter coils and/or receiver coils may be disposed and wound on a sensor and/or multi sensors, in which the number of turns may be varied on any portion on the sensor.

Figure 1:
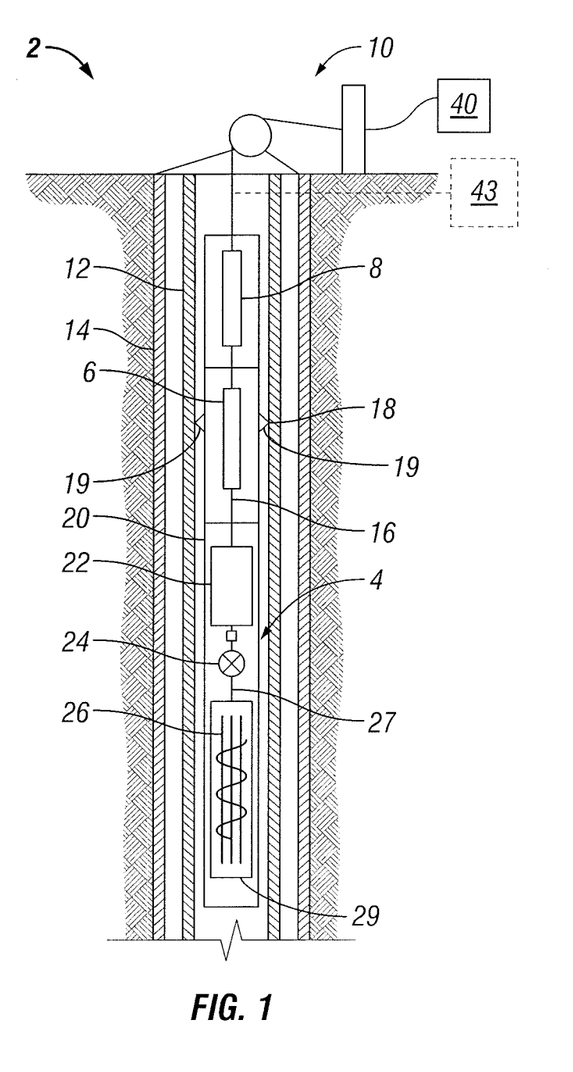
FIG. 1 illustrates an embodiment of an inspection system disposed downhole.

FIG. 1 illustrates an inspection system 2 comprising an inspection device 4, a centralizing module 6, a telemetry module 8, and a service device 10. In embodiments, inspection device 4 may be inserted into tubing 12, wherein tubing 12 may be contained within casing 14. In further embodiments, not illustrated, there may be a plurality of casing 14, wherein tubing 12 may be contained by several additional casings 14. In embodiments, as shown, inspection device 4 may be disposed below centralizing module 6 and telemetry module 8. In other embodiments, not illustrated, inspection device 4 may be disposed above and/or between centralizing module 6 and telemetry module 8. In embodiments, inspection device 4, centralizing module 6, and telemetry module 8 may be connected to tether 16. Tether 16 may be any suitable cable that may support inspection device 4, centralizing module 6, and telemetry module 8. A suitable cable may be steel wire, steel chain, braided wire, metal conduit, plastic conduit, ceramic conduit, and/or the like. A communication line, not illustrated, may be disposed within tether 16 and connect inspection device 4, centralizing module 6, and telemetry module 8 with service device 10. Without limitation, inspection system 2 may allow operators on the surface to review recorded data in real time from inspection device 4, centralizing module 6, and telemetry module 8.

As illustrated in FIG. 1, service device 10 may comprise a mobile platform (i.e. a truck) or stationary platform (i.e. a rig), which may be used to lower and raise inspection system 2. In embodiments, service device 10 may be attached to inspection system 2 by tether 16. Service device 10 may comprise any suitable equipment which may lower and/or raise inspection system 2 at a set or variable speed, which may be chosen by an operator. The movement of inspection system 2 may be monitored and recorded by telemetry module 8.

Telemetry module 8, as illustrated in FIG. 1, may comprise any devices and processes for making, collecting, and/or transmitting measurements. For instance, telemetry module 8 may comprise an accelerator, gyro, and the like. In embodiments, telemetry module 8 may operate to indicate where inspection system 2 may be disposed within tubing 12 and the orientation of sensor array 26. Telemetry module 8 may be disposed at any location above, below, and/or between centralizing module 6 and inspection device 4. In embodiments, telemetry module 8 may send information through the communication line in tether 16 to a remote location such as a receiver or an operator in real time, which may allow an operator to know where inspection system 2 may be located within tubing 12. In embodiments, telemetry module 8 may be centered about laterally in tubing 12.

As illustrated in FIG. 1, centralizing module 6 may be used to position inspection device 4 and/or telemetry module 8 inside tubing 12. In embodiments, centralizing module 6 laterally positions inspection device 4 and/or telemetry module 8 at about a center of tubing 12. Centralizing module 6 may be disposed at any location above and/or below telemetry module 8 and/or inspection device 4. In embodiments, centralizing module 6 may be disposed above inspection device 4 and below telemetry module 8. Centralizing module 6 may comprise arms 18. In embodiments, there may be a plurality of arms 18 that may be disposed at any location along the exterior of centralizing module 6. Specifically, arms 18 may be disposed on the exterior of centralizing module 6. In an embodiment, as shown, at least one arm 18 may be disposed on opposing lateral sides of centralizing module 6. Additionally, there may be at least three arms 18 disposed on the outside of centralizing module 6. Arms 18 may be moveable at about the connection with centralizing module 6, which may allow the body of arm 18 to be move closer and farther away from centralizing module 6. Arms 18 may comprise any suitable material. Suitable material may be but is not limited to, stainless steel, titanium, metal, plastic, rubber, neoprene, and/or any combination thereof. In embodiments, the addition of springs 19 may further make up and/or be incorporated into centralizing module 6. Springs 19 may assist arms 18 in moving centralizing module 6 away from tubing 12, and thus inspection device 4 and telemetry module 8, to about the lateral center of tubing 12. Without limitation, centering inspection device 4 may produce more reliable and accurate voltage readings of tubing 12.

Inspection device 4, as illustrated in FIG. 1, may be located below centralizing module 6 and/or telemetry module 8. Inspection device 4 may be able to detect defects, measure resistivity of tubing 12 and/or casing 14, detect free pipe, and measure wall thickness in tubing 12 and/or casing 14. In embodiments, inspection device 4 may be able to detect, locate transverse and longitudinal defects (both internal and external), determine the deviation of the wall thickness from its nominal value thorough the interpretation of voltage data. Tubing 12 may be made of any suitable material for use in a wellbore. Suitable material may be, but is not limited to, metal, plastic, and/or any combination thereof. Additionally, any type of fluid may be contained within tubing 12 such as without limitation, water, hydrocarbons, and the like. In embodiments, there may be additional tubing which may encompass tubing 12. Inspection device 4 may comprise a housing 20, a memory module 22, a transmitter and receiver controller 24, and a sensory array 26. Housing 20 may be any suitable length in which to protect and house the components of inspection device 4. In embodiments, housing 20 may be made of any suitable material to resist corrosion and/or deterioration from a fluid. Suitable material may be, but is not limited to, titanium, stainless steel, plastic, and/or any combination thereof. Housing 20 may be any suitable length in which to properly house the components of inspection device 4. A suitable length may be about one foot to about ten feet, about four feet to about eight feet, about five feet to about eight feet, or about three feet to about six feet. Additionally, housing 20 may have any suitable width. The width may include a diameter from about one foot to about three feet, about one inch to about three inches, about three inches to about six inches, about four inches to about eight inches, about six inches to about one foot, or about six inches to about two feet. Housing 20 may protect memory module 22, a transmitter and receiver controller 24, and sensory array 26 from the surrounding downhole environment within tubing 12.

As illustrated in FIG. 1, memory module 22 may be disposed within inspection device 4. In embodiments, memory module 22 may store all received, recorded and measured data and may transmit the data in real time through a communication line in tether 16 to a remote location such as an operator on the surface. Memory module 22 may comprise flash chips and/or ram chips, which may be used to store data and/or buffer data communication. Additionally, memory module 22 may further comprise a transmitter, processing unit and/or a microcontroller. In embodiments, memory module 22 may be removed from inspection device 4 for further processing. Memory module 22 may be disposed within any suitable location of housing 20 such as about the top, about the bottom, or about the center of housing 20. In embodiments, memory module 22 may be in communication with differential amplifier 24 and sensor array 26 by any suitable means such as by a connection to differential amplifier 24 and sensor array 26 by a communication line 27. Memory module 22 may record voltage recordings transmitted from differential amplifier 24.

Transmitter and receiver controller 24, as illustrated in FIG. 1, may control the amplitude and phase of transmitter coils, amplifier factor, and signal acquiring period of receiver coils. Transmitter and receiver controller 24 may be pre-configured at the surface to take into account the downhole logging environment and specific logging cases, which may be defined as static configuration, discussed below. It may also be dynamically configured by what a receiver may record. Transmitter and receiver controller 24 may be disposed at any suitable location within housing 20. In embodiments, such disposition may be about the top, about the bottom, or about the center of housing 20.

Figure 2:
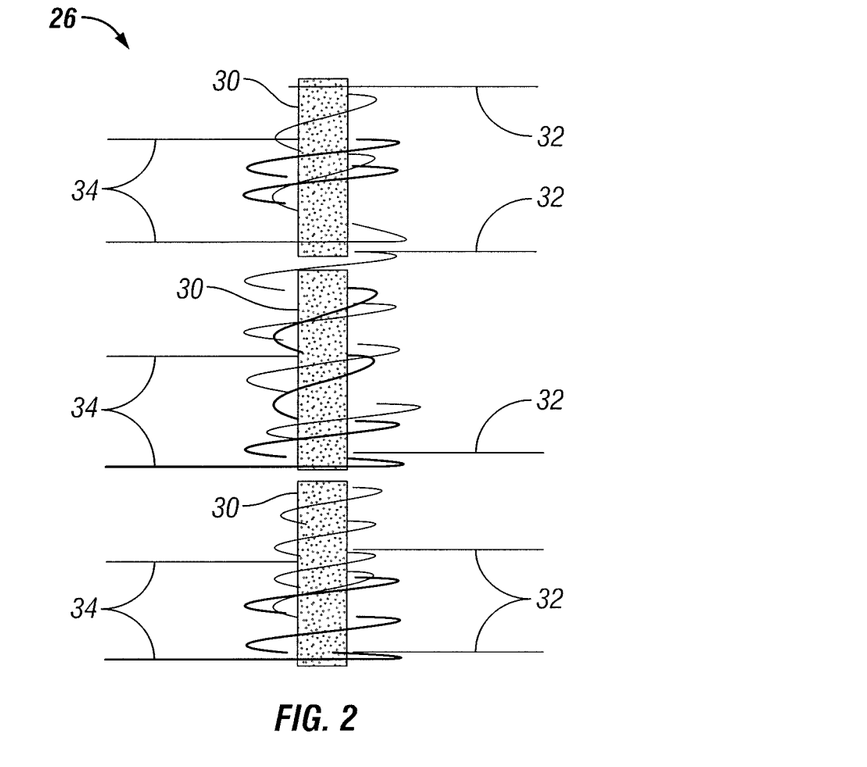
FIG. 2 illustrates an embodiment of a sensor array.

As illustrated in FIGS. 1 and 2, sensor array 26 may create an electro-magnetic field, which may induce an eddy current in surrounding tubing 12 and/or casing 14. The voltage charge within tubing 12 and/or casing 14, from the induced eddy current, may be sensed and recorded by sensor array 26. In embodiments, the recorded voltage may allow identification of the characteristics of tubing 12 and/or casing 14, discussed below. Sensor array 26 may be disposed within a sensor array housing 29. Sensor array housing 29 may be composed of any suitable non-ferrous material such as plastic, ceramic, and the like. In embodiments, sensor array 26 may be disposed in a fluid within sensor array housing 29. This may prevent sensor array 26 from moving during operations and further protect sensor array 26 from subsurface pressure. Sensor array 26 may be disposed at any suitable location within housing 20. Such disposing may be at about the top, about the bottom, or about the center of housing 20. Additionally, there may be a plurality of sensor arrays 26 disposed throughout housing 20. As illustrated in FIG. 2, sensory array 26 may comprise at least one receiving coil array 32, at least one ferri-core 30, and at least one transmitter coil array 34. In embodiments, receiving coil array 32 may comprise any suitable material. Suitable material may be, but is not limited to, aluminum, copper, nickel, steel, and/or any combination thereof. Receiving coil array 32 may be any suitable length. A suitable length may be, but is not limited to, about one inch to about three inches, about two inches to about four inches, about three inches to about six inches, about four inches to about eight inches, about five inches to about ten inches, or about six inches to about twelve inches. Receiving coil array 32 may be longer than ferri-core 30. Receiving coil array 32 may be any suitable shape. A suitable shape may be, but is not limited to, round, oval, square, triangular, polyhedral, and/or any combination thereof. Without limitation, receiving coil array 32 may comprise any number of suitable windings. Receiving coil array 32 may sense voltage from the emitted electro-magnetic field as originally transmitted by transmitter coil array 34. The difference in the voltages measured from tubing 12 by at least one sensor array 26 may be used to identify characteristics of tubing 12 and/or casing 14. The electro-magnetic field may be transmitted, directed, and focused within a desired area by ferri-core 30.

Ferri-core 30, as illustrated in FIG. 2 may be a medium in which an electro-magnetic field is broadened, which may induce an eddy current within tubing 12. In embodiments, ferri-core 30 may comprise any suitable material. Suitable material may be, but is not limited to, ferrite, silicon steel, nickel steel, alloy powder core, and/or any combination thereof. Ferri-core 30 may be any suitable length. A suitable length may be, but is not limited to, about one inch to about three inches, about two inches to about four inches, about three inches to about six inches, about four inches to about eight inches, about five inches to about ten inches, or about six inches to about twelve inches. In embodiments, ferri-core 30 may be shorter than receiving coil array 32. Ferri-core 30 may be any suitable shape. A suitable shape may be, but is not limited to, round, oval, square, triangular, polyhedral, and/or any combination thereof. Additionally, ferri-core 30 may be configured in any suitable structure in which to transmit an electro-magnetic field to and through tubing 12. Without limitation, structures of ferri-core 30 may vary. Specifically, a configuration may be dumbbell-shaped, hammer-shaped, side tapered, and/or center tapered. Each configuration may produce a different type of electro-magnetic field. For example, a dumbbell-shaped ferri-core 30 may focus and/or guide the electro-magnetic field horizontally to a desired depth. A hammer-shaped ferri-core 30 may block magnetic interference from an end of ferri-core 30. A tapered shaped ferri-core 30 may reduce motion noise. A center tapered ferri-core 30 may focus the electro-magnetic field about the center of fern-core 30. In embodiments, ferri-core 30 may be a structure in which receiver coil array 32 and transmitter coil array 34 may be disposed.

Transmitter coil array 34, as illustrated in FIG. 2 may be a wire, which may be wound around all ferri-cores 30 and receiving coil array 32. In embodiments, transmitter coil array 34 may comprise any suitable material. Suitable material may be, but is not limited to, aluminum, copper, nickel, steel, and/or any combination thereof. In embodiments, transmitter coil array 34 may eliminate coupling power This may be accomplished as each ferri-core 30 may transmit magnetic flux with transmitter coil array 34. The magnetic flux may be directed in the same direction due to each ferri-core 30, which may eliminate individual magnetic flux loops. Transmitter coil array 34 may boost the power associated with the production of an electro-magnetic field. This may increase the distance in which the electro-magnetic field may extend from sensor array 26. Without limitation, transmitter coil array 34 may comprise any number of suitable windings. During operation, transmitter coil array 34 may be energized to produce an electro-magnetic field through ferri-core 30, which may induce an eddy current in tubing 12 and/or casing 14. Transmitter coil array 34 may then be switched off, which may allow for receiving coil array 32 to record the voltage within tubing 12 and/or casing 14, as produced from the induced eddy current. A microprocessor and/or control unit may be used to direct current into and out of transmitter coil array 34. Current may be used to energize transmitter coil array 34, which may create an electro-magnetic field through ferri-core 30. Additionally, the microprocessor may be used to record and transmit the recorded voltages within receiving coil array 32.

An electro-magnetic field may be produced and emitted from sensor array 26. In embodiments, the electro-magnetic field may be strong and large enough to induce an eddy current in a second tube and/or a second casing (not illustrated). Without limitation, the electro-magnetic field may be able to induce an eddy current into a fifth casing and may be up to three feet into a formation. It should be noted that electro-magnetic field may induce an eddy current in additional outside tubing. Electro-magnetic field may be directed by ferri-core 30. As discussed above, different configurations of ferri-core 30 may direct electro-magnetic field differently, which may be selected by the operator. In embodiments, transmitter coil array 34 may be turned off and on at any given length of time. When turned on, the transmitter coil array 34 may produce an electro-magnetic field, which may be directed by ferri-core 30 and induce eddy current in tubing 12 and/or casing 14. Transmitter coil array 34 may then be switched off, which may allow for receiving coil array 32 to sense and record the voltage produced by the induced eddy current. Turning transmitter coil array 34 on and off may be repeated continuously as measurements of tube 12 and/or casing 14, any additional outer tubing 12 and/or casing 14, may be performed.

Measurements, inspections, and detection may take place as inspection device 4 moves through tube 12 in any direction. Travel time of inspection device 4 through a zone of interest within tube 12 may depend on the duration of pulses and amplitude used to produce and transmit an electro-magnetic field through inspection device 4. Duration of a pulse may be set so that the signal variation between the excitation time and the "infinite" excitation time may be less than the noise constantly detected at signal level. Duration may vary based on the "electromagnetic" wall thickness of the inspected tube 12. Electromagnetic wall thickness refers to the given conductivity and relative permeability with tube 12 thickness. The electro-magnetic field created by the pulse may be used to induce an eddy current in tube 12 and/or additional tubing. Additionally, ferri-cores 30 may allow for inspection device 4 to transmit an electro-magnetic field three hundred and sixty degrees, which may allow inspection device 4 to inspect the entirety of tube 12, surrounding tubes, and/or casing 14.

In embodiments, signals recorded by receiving coil array 32 may be processed using information handling system 40. Referring to FIG. 1, information handling system 40 may be disposed within inspection device 4 at any location. Without limitation, information handling system 40 may also be disposed on the surface within service device 10. Processing may take place within information handling system 40 within inspection device 4 and/or on the surface in service device 10. Information handling system 40 within inspection device 4 may connect to service device 10 through waveguide 43, which may be disposed within tether 16. It is to be understood that waveguide 43, as shown disposed in FIG. 1 for illustration purposes only, may be disposed within tether 16. Information handling system 40 may act as a data acquisition system and possibly a data processing system that analyzes signals from receiving coil array 32, for example, to derive one or more properties of tubing 12 and/or casing 14.

Without limitation in this disclosure, information handling system 40 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, information handling system 40 may be a personal computer, a network storage device, or any other suitable device and may vary in size, shape, performance, functionality, and price. Information handling system 40 may include random access memory (RAM), one or more processing resources such as a central processing unit (CPU) or hardware or software control logic, ROM, and/or other types of nonvolatile memory. Additional components of information handling system 40 may include one or more disk drives, one or more network ports for communication with external devices as well as various input and output (I/O) devices, such as a keyboard, a mouse, and a video display. Information handling system 40 may also include one or more buses operable to transmit communications between the various hardware components.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 3:
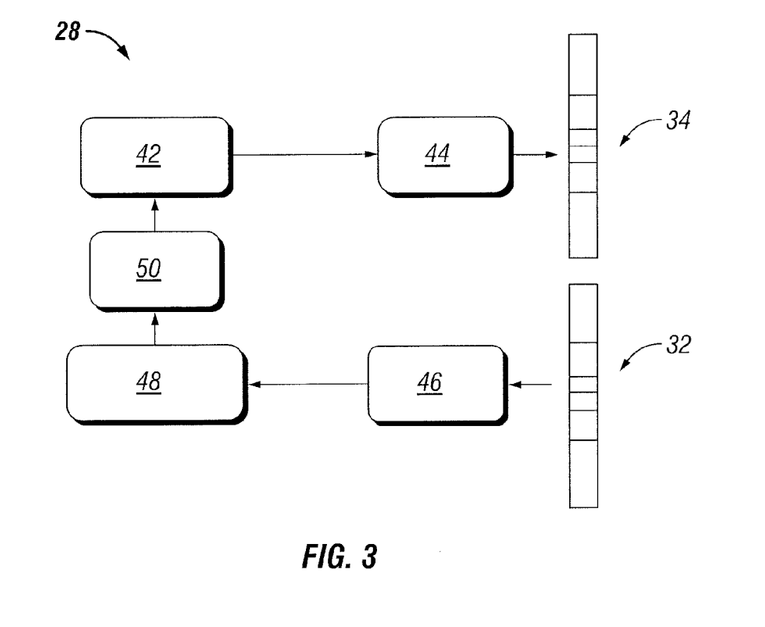
FIG. 3 illustrates an embodiment of a system diagram of a dynamic control that an information handling system may perform.

Information handling system 40 may dynamically control sensor array 26 based on the conditions experienced by inspection device 4. FIG. 3 illustrates a system diagram of the dynamic controls information handling system 40 may perform during operation. During operation, information handling system 40 may first operate sensor array 26 based on a pre-determined static configuration 42. Static configuration 42 may be described as the initial configuration of sensor array 26 based on known requirements and the environment inspection device 4 may experience within tubing 12. It should be noted that there may be one or more initial configurations, which may be selected based on time and/or location of information handling system 40. Static configuration 42 may be fed to a transmitter matrix switch 44, which may be a component of information handling system 40. Without limitation, transmitter matrix switch 44 may be activated manually and/or automatically controlled by information handling system 40. Transmitter matrix switch 44 may then alter transmitter coils 34 within sensor array 26. Configuration of transmitter coil array 34 may alter the amplitude and/or phase of an emitted magnetic field from transmitter coil array 34. As described above, different configurations may affect the emitted magnetic field in different ways. Without limitation, receiver matrix switch 46 may record signals and electromagnetic fields produced by tubing 12 and/or casing 14 (Referring to FIG. 1) with receiving coil array 32. Recordings from receiver matrix switch 46 may produce eddy current measurements 48. Eddy current measurements 48 may be fed into a microcontroller unit 50. During operation, the movement of inspection device 4 (not illustrated), eddy current measurements 48, and the requested operation and/or detail of recording by receiving coil array 32 may lead to a change in static configuration 42. Micro controller unit 50, which may also communicate with information handling system 40, may take the information as to the movement of inspection device 4, eddy current measurements 48, and receiving coil array 32 recording requirements into consideration to alter the configuration of transmitter coil array 34, and receiving coil array 32. Desired alteration may be sent by micro controller unit 50, which may re-configure transmitter coil array 34 and/or receiving coil array 32 during operation. This may result in more accurate and detailed eddy current measurements 48.

Without limitation, different lengths, windings, and/or configuration of transmitter coil array 34 and receiver coil array 32 may allow for the creation of a transmitter coil matrix and a receiver coil matrix of recorded signals, seen below.

$$TX = \begin{matrix} tx_{1,1} & \ldots & tx_{1,N} \\ & tx_{m,n} & tx_{m,n+1} & tx_{m,n+2} \\ \ldots & tx_{m+1,n} & tx_{m+1,n+1} & tx_{m+1,n+2} & \ldots \\ & tx_{m+1,n} & tx_{m+2,n+1} & tx_{m+1,n+2} \\ tx_{M,1} & \ldots & tx_{M,N} \end{matrix} \quad (1)$$

$$RX = \begin{matrix} rx_{1,1} & \ldots & rx_{1,N} \\ & rx_{m,n} & rx_{m,n+1} & rx_{m,n+2} \\ \ldots & rx_{m+1,n} & rx_{m+1,n+1} & rx_{m+1,n+2} & \ldots \\ & rx_{m+1,n} & rx_{m+2,n+1} & rx_{m+1,n+2} \\ rx_{M,1} & \ldots & rx_{M,N} \end{matrix} \quad (2)$$

Figure 4A:
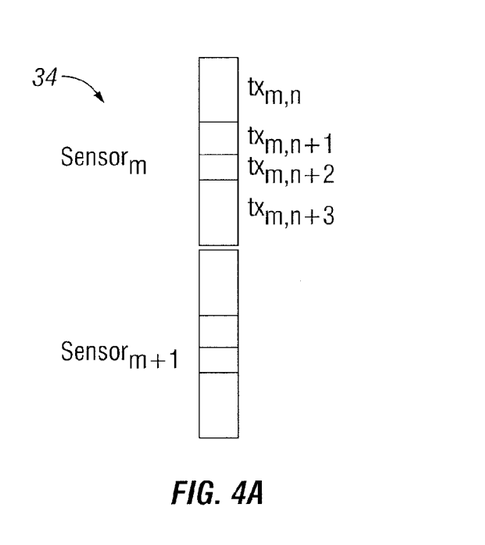
FIG. 4a illustrates an embodiment of a transmitter coil.
Figure 4B:
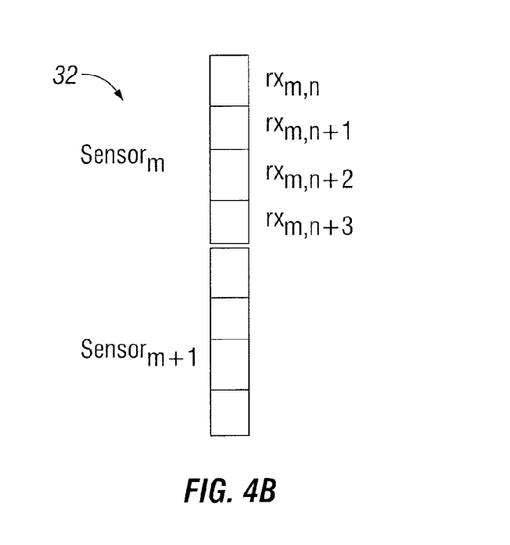
FIG. 4b illustrates an embodiment of a receiver coil.

FIG. 4a illustrates transmitter coil array 34, which may comprise a plurality of transmitters. Each transmitter may be represented by a variable, which may be within the transmitter coil matrix. As illustrated in FIG. 4a, transmitter coil array 34 may be an aperture selective magnetic sensor array formed by individual transmitter coil elements. Transmitter coil array 34 may wind on one or multiple ferritic magnetic cores. Without limitation, side coil length may exponentially increase. Within the transmitter coil matrix, a repeatable transmitter coil array may form identical rows of the transmitter coil matrix. The transmitter coil matrix may be symmetric or asymmetric and the sign may be positive or negative. Transmitter coil matrix "TX" may comprise values of signal strength from a plurality of transmitter coil arrays 34. In examples, TXm, n+1 may represent the transmitter coil located on sensor m, and number n+1 counting from the top to the bottom of transmitter coil array 34. FIG. 4b illustrates receiver coil array 32, which may comprise a plurality of receivers. Each receiver may be represented by a variable, which may be within the receiver coil matrix. Without limitation, a receiver and/or a plurality of receiver may have windings on the same ferritic core. In examples, receivers may have different winding schemes compared to a transmitter. Recievers may be either uniform and/or exponential. Without limitation, receiver coil matrix "RX" may comprise recorded measurements from a plurality of receiver coil arrays 32. RXm, n+1 may represent the receiver coil located on sensor m, and number n+1 counting from the top to the bottom of receiver coil array 32.

With the transmitter matrix and receiver matrix, an operator may be able to identify the parameters of a target using the equation below.

$$\text{Receiving Signal} = \text{Target}^* \begin{matrix} \ldots & & & \ldots \\ tx_{m,n} & tx_{m,n+1} & tx_{m,n+2} \\ tx_{m+1,n} & x_{m+1,n+1} & x_{m+1,n+2} \\ tx_{m+1,n} & x_{m+2,n+1} & x_{m+1,n+2} \\ \ldots & & & \ldots \end{matrix} \times \begin{matrix} \ldots & & & \ldots \\ rx_{m,n} & rx_{m,n+1} & rx_{m,n+2} \\ rx_{m+1,n} & rx_{m+1,n+1} & rx_{m+1,n+2} \\ rx_{m+1,n} & rx_{m+2,n+1} & rx_{m+1,n+2} \\ \ldots & & & \ldots \end{matrix} \quad (3)$$

A three step method may be implemented to solve this equation, which may yield info'nation regarding properties of tubing 12 and/or casing 14. Without limitation, the properties of a plurality of outer tubing 12 and a plurality of outer casings 14 may also found. First, target properties may be entered and without limitation, properties may comprise size, horizontal distance, vertical and horizontal resolution, and/or signal level. Second, different parts of the transmitter matrix and/or receiver matrix may be selected to best fit measurements. This may be signified by a box, as seen above, which may highlight the variables selected for what an operator may be solving for. Third, post processing, wherein multiple firings of transmitter coil array 34, which may be variables within the transmitter matrix, may be selected with the same and/or different matric combinations. Within each matrix, transmitter matrix and/or receiver matrix, an operator may be able to choose different combinations within each matrix to solve for different variables within the equation.

For example, the first readings of the transmitter matrix and/or receiver matrix as seen below:

$$TX = \begin{vmatrix} \ldots & tx_{m,n-1} & \boxed{tx_{m,n}} & tx_{m,n+1} & \ldots \end{vmatrix}$$

$$RX = \begin{vmatrix} \ldots & rx_{m,n-1} & \boxed{rx_{m,n}} & rx_{m,n+1} & \ldots \end{vmatrix}$$

may be implemented to detect the thickness of tubing 12 and/or casing 14. In examples, there may be a plurality of tubing 12 and/or a plurality of casing 14. Different apertures may be needed to identify different thicknesses of a plurality of tubing 12 and/or a plurality of casing 14. Different apertures may identify a plurality of casings 14 individually, which may be at different distances from tubing 12. Without limitation, a second excitation of transmitter coil array 34 may recorded signals from a tube 12 and/or casing 14 that may be different from a first excitation of transmitter coil array 34, which may extract signals from tubing 12 and/or casing 14. Different excitation combinations of transmitter coil array 34 may help in determining the thickness of different tubing 12 and/or casing 14. For instance, multiple pipes may need to be measured, where different apertures may be needed on different firings. In examples, the first firing may use only $tx_{m,n}$ for first pipe, then use $tx_{m,n-1}+tx_{m,n}+tx_{m,n+1}$ for first and second pipe, and so on; wherein receiver may use same Row m. A second firing could differentiate with first firing to extract majority signal on second pipe, third firing could differentiate with second firing to extract majority signal on third pipe and so on.

In examples, the first and second recording of the transmitter matrix and/or receiver matrix as seen below:

$$TX = \begin{matrix} \ldots & & & \ldots \\ & tx_{m,n} & tx_{m,n+1} & tx_{m,n+2} \\ & tx_{m+1,n} & tx_{m+1,n+1} & tx_{m+1,n+2} \\ \ldots & & & \ldots \end{matrix} \quad (6)$$

$$RX = \begin{matrix} \ldots & & & \ldots \\ & rx_{m,n} & rx_{m,n+1} & rx_{m,n+2} \\ & rx_{m+1,n} & rx_{m+1,n+1} & rx_{m+1,n+2} \\ \ldots & & & \ldots \end{matrix} \quad (7)$$

to detect free pipe. This may be implemented to determine the location of tubing 12 that may be stuck and/or free in a wellbore (not illustrated). Without limitation, two excitations of the transmitter matrix array and two recordings of the receiver matrix may be implemented in combination to achieve higher resolution of a recorded signal, which may allow for determining stuck and/or free tubing 12. For instance, signal change may be may be small between stuck point, two firings select two matrix combination may be used. On first firing, all transmitter and receiver on Row m may be enabled, on second firing, all transmitter and receiver on row m+1 may be enabled. Signals received on two firings may differentiate to achieve higher resolution.

In examples, the entire reading of the transmitter matrix and/or every other recording of the receiver matrix below:

$$TX = \begin{matrix} \ldots & & & \ldots \\ & tx_{m,n} & tx_{m,n+1} & tx_{m,n+2} \\ & tx_{m+1,n} & tx_{m+1,n+1} & tx_{m+1,n+2} \\ & tx_{m+1,n} & tx_{m+2,n+1} & tx_{m+1,n+2} \\ \ldots & & & \ldots \end{matrix} \quad (8)$$

$$RX = \begin{matrix} \ldots & & & \ldots \\ & rx_{m,n} & rx_{m,n+1} & rx_{m,n+2} \\ & rx_{m+1,n} & rx_{m+1,n+1} & rx_{m+1,n+2} \\ & rx_{m+2,n} & rx_{m+2,n+1} & rx_{m+1,n+2} \\ \ldots & & & \ldots \end{matrix} \quad (9)$$

may further be implemented to determine formation resistivity outside tubing 12 and/or casing 14. Target properties may comprise large depth of measurement from transmitter coil array 34 due to high contrast of casing 14 and a formation. Thus, when exciting transmitter coil array 34, the transmitter aperture may be as large as possible and receiver array 32 may recorded at different rows to help differentiate resistivity of casing 14 to increase signal to noise ratio, which may help eliminate the casing effect. To diminish casing effects, every other row of the receiver matrix may be differentiated with each other to remove a common mode signal generated by tubing 12, which may increase the signal to noise ratio. Casing effects may be defined as eddy current generated within tubing 12, which may interfere with determining target properties within the transmitter matrix and/or the receiver matrix, Without limitation, target propert may be determined by large depth of measurement, due to high contrast of casing and formation, and very small signal to noise ratio. The transmitter aperture may need to be a large as possible by electing a full matrix. A receiver matrix may need differential to increase signal to noise ratio. To eliminate casing effect, signal receiver on Row m and Row m+2 first differentiate with Row m+1, then differentiate each other.

Although the present invention and its advantages have been described in detail, it should be understood that various changes, substitutions and alterations may be made herein without departing from the spirit and scope of the invention as defined by the appended claims.

What is claimed is:

1. A method for detecting through casing formation resistivity comprising:
    inserting an inspection device inside a tube, wherein the inspection device comprises:
        a sensor array comprising:
            a transmitter coil array comprising at least one transmitter; and
            a receiver coil array comprising at least one receiver;
        a micro controller unit;
        a telemetry module;
        a centralizing module;
    activating at least one designated transmitter within the transmitter coil array;
    recording signals with at least one designated receiver within the receiver coil array;
    creating a transmitter matrix from an electromagnetic field produced from the transmitter coil array, wherein each designated transmitter is represented by a variable;
    creating a receiver matrix from the signals recorded by the receiver coil array, wherein each designated receiver is represented by a variable; and
    determining a through casing formation resistivity of a target from the transmitter matrix and the receiver matrix.

2. The method of claim 1, wherein the transmitter matrix comprises electromagnetic field measurements at different depths.

3. The method of claim 2, wherein the receiver matrix comprises recordings of signals at different depths.

4. The method of claim 3, wherein each depth of the transmitter matrix and at least every other depth of the receiver matrix are computed to find at least one property of the target.

5. The method of claim 1, wherein the micro controller unit is connected to an information handling unit.

6. The method of claim 5, wherein the information handling unit determines the property of the target.

7. The method of claim 1, wherein the sensor array is disposed at a location, and wherein the transmitter coil and the receiver coil array are disposed at about the same location of the sensor array.

8. A method for detecting casing thickness comprising:
inserting an inspection device inside a tube, wherein the inspection device comprises:
a sensor array comprising:
a transmitter coil array comprising at least one transmitter; and
a receiver coil array comprising at least one receiver;
a micro controller unit;
a telemetry module;
a centralizing module;
activating at least one designated transmitter within the transmitter coil array;
recording signals with at least one designed receiver within the receiver coil array;
creating a transmitter matrix from an electromagnetic field produced from the transmitter coil array, wherein each designated transmitter is represented by a variable;
creating a receiver matrix from the signals recorded by the receiver coil array, wherein each designated receiver is represented by a variable; and
determining a casing thickness of a target from the transmitter matrix and the receiver matrix.

9. The method of claim 8, wherein the transmitter matrix comprises electromagnetic field measurements at a first depth within the tube.

10. The method of claim 9, wherein the receiver matrix comprises recordings of signals at the first depth within the tube.

11. The method of claim 10, wherein a first depth of the transmitter matrix and a first depth of the receiver matrix are computed to find at least one property of the target.

12. The method of claim 8, wherein the micro controller unit is connected to an information handling unit.

13. The method of claim 12, wherein the information handling unit determines the property of the target.

14. The method of claim 8, wherein the sensor array is disposed at a location, and wherein the transmitter coil and the receiver coil array are disposed at about the same location of the sensor array.

15. An inspection device comprising:
a sensor array comprising:
a transmitter coil array, wherein the transmitter coil array may comprise a plurality of transmitters, wherein the plurality of transmitters comprise a ferri-core and a winding, wherein the winding is a different length for each of the plurality of transmitters and the core is a different length for each of the transmitters;
a receiver coil array, wherein the receiver coil array may comprise a plurality of receivers;
a sensor array housing, wherein the sensor array is disposed within the sensor array housing;
a memory module; and
a differential amplifier.

16. The inspection device of claim 15, wherein the winding is disposed about the ferri-core of at least one of the plurality of transmitters.

* * * * *